US008957180B2

(12) United States Patent
Scherzer et al.

(10) Patent No.: US 8,957,180 B2
(45) Date of Patent: Feb. 17, 2015

(54) PROCESS FOR PRODUCING MOLDINGS

(75) Inventors: Dietrich Scherzer, Neustadt (DE);
Philippe Desbois,
Edingen-Neckarhausen (DE); Freddy Gruber, Offenbach (DE); Achim Stammer, Freinsheim (DE)

(73) Assignee: BASF SE, Ludwigshafen (DE)

( * ) Notice: Subject to any disclaimer, the term of this patent is extended or adjusted under 35 U.S.C. 154(b) by 186 days.

(21) Appl. No.: 13/588,484

(22) Filed: Aug. 17, 2012

(65) Prior Publication Data
US 2013/0053535 A1 Feb. 28, 2013

Related U.S. Application Data

(60) Provisional application No. 61/526,268, filed on Aug. 23, 2011.

(51) Int. Cl.
*C08G 69/14* (2006.01)
*B29B 9/10* (2006.01)

(52) U.S. Cl.
CPC .. *C08G 69/14* (2013.01); *B29B 9/10* (2013.01)
USPC ........... 528/323; 528/310; 528/314; 528/325; 528/326

(58) Field of Classification Search
USPC ........................ 528/310, 314, 323, 325, 326
See application file for complete search history.

(56) References Cited

U.S. PATENT DOCUMENTS

| | | |
|---|---|---|
| 3,304,291 A | 2/1967 | Dachs et al. |
| 6,098,895 A | 8/2000 | Walzel et al. |
| 2011/0244743 A1 | 10/2011 | Scherzer et al. |
| 2011/0288258 A1 | 11/2011 | Desbois et al. |
| 2011/0294910 A1 | 12/2011 | Kriha et al. |
| 2012/0022187 A1 | 1/2012 | Desbois et al. |
| 2012/0046374 A1 | 2/2012 | Scherzer et al. |
| 2012/0065339 A1 | 3/2012 | Grutzner et al. |
| 2012/0088048 A1 | 4/2012 | Scherzer et al. |
| 2012/0088899 A1 | 4/2012 | Scherzer et al. |
| 2012/0119402 A1 | 5/2012 | Desbois et al. |
| 2012/0141791 A1 | 6/2012 | Biedasek et al. |
| 2012/0142794 A1 | 6/2012 | Desbois et al. |
| 2012/0142887 A1 | 6/2012 | Desbois et al. |
| 2012/0157654 A1 | 6/2012 | El-Toufaili et al. |
| 2012/0214904 A1 | 8/2012 | Prusty et al. |
| 2012/0222809 A1 | 9/2012 | Scherzer et al. |
| 2012/0225995 A1 | 9/2012 | Desbois et al. |
| 2012/0245283 A1 | 9/2012 | Desbois et al. |
| 2012/0245308 A1 | 9/2012 | El-Toufaili et al. |
| 2012/0273984 A1 | 11/2012 | Desbois et al. |

FOREIGN PATENT DOCUMENTS

| | | |
|---|---|---|
| DE | 1420241 A1 | 2/1969 |
| DE | 1720259 A1 | 6/1971 |
| DE | 1679881 A1 | 3/1972 |
| DE | 4308842 A1 | 9/1994 |
| GB | 1208476 A | 10/1970 |
| WO | WO-2011039301 A1 | 4/2011 |
| WO | WO-2011069942 A1 | 6/2011 |
| WO | PCT/EP2012/062792 | 7/2012 |
| WO | PCT/EP2012/066175 | 8/2012 |

OTHER PUBLICATIONS

U.S. Appl. No. 13/588,446, filed Aug. 17, 2012, BASF SE.
U.S. Appl. No. 61/370,473.
U.S. Appl. No. 61/371,180.
U.S. Appl. No. 61/374,639.
U.S. Appl. No. 61/473,828.
U.S. Appl. No. 61/521,399.
U.S. Appl. No. 61/588,185.
U.S. Appl. No. 61/615,918.
U.S. Appl. No. 61/643,905.
U.S. Appl. No. 61/668,488.
U.S. Appl. No. 13/594,202.
U.S. Appl. No. 13/612,382.
U.S. Appl. No. 13/630,462.
U.S. Appl. No. 13/637,894.
U.S. Appl. No. 13/682,091.
Bottenbruch, et al. "Technische Thermoplast Polyamide" Kunststoff Handbuch, Herstellung der Polyamide, pp. 49-52.
Ricco, et al., "Anionic Poly ϵ-caprolactam): Relationships among Conditions of Synthesis, Chain Regularity, Reticular Order, and Polymorphism" Macromolecules (1999) 32, pp. 7726-7731.

*Primary Examiner* — Gregory Listvoyb
(74) *Attorney, Agent, or Firm* — Drinker Biddle & Reath LLP

(57) ABSTRACT

The present invention relates to a process for producing moldings comprising (A) at least one lactam, (B) at least one activator, and (C) at least one catalyst, where (A) to (C) proceed through treatments comprising a) mixing of (A), (B), and (C), b) metering of (A), (B), and (C) into an apparatus for producing mixture droplets, and producing mixture droplets, and c) depositing the mixture droplets comprising (A), (B), and (C) on a belt, and d) producing moldings.

6 Claims, No Drawings

PROCESS FOR PRODUCING MOLDINGS

CROSS-REFERENCE TO RELATED APPLICATIONS

This application claims benefit (under 35 U.S.C. 119(e)) of U.S. Provisional Application 61/526,268, filed Aug. 23, 2011, which is incorporated by reference.

The present invention relates to a process for producing moldings comprising (A) at least one lactam, (B) at least one activator, and (C) at least one catalyst, where (A) to (C) proceed through treatments comprising a) mixing of (A), (B), and (C), b) metering of (A), (B), and (C) into an apparatus for producing mixture droplets, and producing mixture droplets, and c) depositing the mixture droplets comprising (A), (B), and (C) on a belt, and d) producing moldings.

The process for producing polyamide by activated anionic lactam polymerization is known in principle.

Lactams such as caprolactam, laurolactam, piperidone, and pyrrolidone, and also lactones such as caprolactone, can be polymerized with ring-opening in a base-catalyzed anionic polymerization reaction. The general method here polymerizes a melt made of lactam and/or lactone comprising an alkaline catalyst and what is known as an activator (or co-catalyst or initiator) at temperatures of about 150° C.

DE-A 14 20 241 describes an anionic polymerization reaction of lactams in the presence of potassium hydroxide as catalyst and with use of 1,6-bis(N,N-dibutylureido)hexane as activator. The activated anionic lactam polymerization reaction with use of sodium caprolactam is described by way of example in Polyamide, Kunststoff Handbuch [Polyamides, Plastics Handbook], vol. 3/4, ISBN 3-446-16486-3, 1998, Carl Hanser Verlag, pp.49-52, and Macromolecules, Vol. 32, No.23 (1999), p. 7726.

DE 1 720 259 discloses a process for the continuous anionic polymerization of lactams to give polyamide strands.

DE 1679 881 discloses a process and an apparatus for preparing polyamides from dry starting materials. Treatment takes place in an extruder.

It was an object of the present invention to provide a process which provides moldings consisting essentially of a polymer melt. Another object of the invention was to provide a process which can be conducted by using a system which requires little space. A further intention was to develop a process which provides a product which can be further processed directly per se.

For the purposes of the present invention, the term "molding" means a particle which is solid at a temperature of 25° C. It is preferable that the moldings of the invention remain solid even at higher temperatures, e.g. at 50° C. The shape of an individual molding can be spherical or almost spherical. The shape of the moldings can also be that of pellets or of flakes.

In order to facilitate draw-off, transport, storage, and further processing in an extruder, the process should provide the moldings in a flowable form. The moldings are thus intended to facilitate further processing at a customer's premises.

For the purposes of the invention, moldings which consist essentially of a polymer melt are moldings which consist essentially of polyamide. The weight-average molar mass (Mw) of this polyamide is 50 000 to 1 000 000 g/mol. The moldings can comprise catalyst, activator, and optionally at least one additive, alongside polyamide.

The object of the invention is achieved as described in the introduction.

Particularly suitable lactams (A) are caprolactam, piperidone, pyrrolidone, laurolactam, and mixtures of these.

Another possibility is to use a mixture of lactam and lactone as monomer instead of a lactam. Examples of lactones that can be used are caprolactone and butyrolactone. The amount of lactone as comonomer here should not exceed 40% by weight, based on entire monomer. It is preferable that the proportion of lactone as comonomer does not exceed 30% by weight, and particularly does not exceed 20% by weight, based on entire monomer.

One preferred embodiment of the invention uses exclusively lactams as monomers. In particular, at least one monomer selected from the following group is used as lactam (A): caprolactone, piperidone, pyrrolidone, laurolactam, and mixtures of these.

The process of the invention uses a catalyst (B). For the purposes of the present invention, a catalyst for the anionic polymerization reaction is a compound which enables formation of lactam anions. The lactam anions per se can also function as catalyst.

Catalysts (B) of this type are known to the person skilled in the art. For the purposes of the present invention, it is preferable to use a catalyst (B) selected from the group consisting of sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium ethanolate, sodium propanolate, sodium butanolate, potassium hydride, potassium, potassium hydroxide, potassium methanolate, potassium ethanolate, potassium propanolate, potassium butanolate, and mixtures of these, preferably sodium caprolactamate, potassium caprolactamate, magnesium bromide caprolactamate, magnesium chloride caprolactamate, magnesium biscaprolactamate, sodium hydride, sodium, sodium hydroxide, sodium methanolate, sodium methanolate, sodium propanolate, sodium butanolate, potassium hydride, potassium, potassium hydroxide, potassium methanolate, potassium ethanolate, potassium propanolate, potassium butanolate, and mixtures of these.

It is particularly preferable to use a catalyst (B) selected from the group consisting of sodium hydride, sodium, and sodium caprolactamate; particular preference is given to sodium caprolactamate and/or a solution of sodium caprolactamate in caprolactam (e.g. Brüggolen (Brüggemann, DE) C10; 18% by weight of sodium caprolactamate in caprolactamate).

The molar ratio of lactam (A) to catalyst (B) can vary widely, and is generally from 1:1 to 10 000:1, preferably from 5:1 to 1000:1, particularly preferably from 1:1 to 500:1.

Activator (C) used for the anionic polymerization reaction comprises a compound selected from the group of the lactams N-substituted by electrophilic moieties, the aliphatic diisocyanates, the aromatic diisocyanates, the polyisocyanates, the aliphatic diacyl halides, and aromatic diacyl halides.

Among the lactams N-substituted by electrophilic moieties are by way of example acyllactams. Activator (C) can also be precursors for these activated N-substituted lactams, where these form in situ, together with the lactam (A) an activated lactam.

Suitable compounds among the aliphatic diisocyanates as activator (C) are those such as butylene diisocyanate, hexamethylene diisocyanate, octamethylene diisocyanate, decamethylene diisocyanate, undodecamethylene diisocyanate, dodecamethylene diisocyanate, 4,4'-methylenebis(cyclohexyl isocyanate), isophorone diisocyanate, aromatic diisocyanates such as tolyl diisocyanate, 4,4'-methylenebis(phenyl isocyanate), and polyisocyanates (e.g. isocyanates of hexamethylene diisocyanate; Basonat HI 100/BASF SE), and allophanates (e.g. ethyl allophanate). In particular, mixtures of the compounds mentioned can be used as activator (C).

Suitable aliphatic diacyl halides are compounds such as butylenedioyl chloride, butylenedioyl bromide, hexamethylenedioyl chloride, hexamethylenedioyl bromide, octamethylenedioyl chloride, octamethylenedioyl bromide, decamethylenedioyl chloride, decamethylenedioyl bromide, dodecamethylenedioyl chloride, dodecamethylenedioyl bromide, 4,4'-methylenebis(cyclohexyloyl chloride), 4,4'-methylenebis(cyclohexyloyl bromide), isophoronedioyl chloride, isophoronedioyl bromide; and also aromatic diacyl halides, such as tolylmethylenedioyl chloride, 4,4'-methylenebis (phenyl) acyl chloride, and 4,4'-methylenebis(phenyl) acyl bromide. In particular, mixtures of the compound mentioned can be used as activator (C). In one preferred embodiment, activator (C) used comprises at least one compound selected from the group comprising hexamethylene diisocyanate, isophorone diisocyanate, hexamethylenedioyl bromide, hexamethylenedioyl chloride, and mixtures of these; it is particularly preferable to use hexamethylene diisocyanate. An example of a suitable activator (C) is Bruggolen C20 (NCO content 17%) from Brüggemann, DE.

The amount of activator (C) defines the number of growing chains, since each activator molecule represents the initial member of a polymer chain. The molar ratio of lactam (A) to activator (C) can vary widely and is generally from 1:1 to 10 000:1, preferably from 5:1 to 2000:1, particularly preferably from 20:1 to 1000:1.

At least one further component selected from fillers and/or fibrous substances, polymers, and further additives can be added as additional substance (D) to the moldings.

At least one polymer can be added to the moldings. By way of example, a polymer and/or oligomer which forms in situ via polymerization of the monomers comprised in the composition can be added to the moldings. The amount comprised of this optionally added polymer is by way of example from 0 to 40% by weight, preferably from 0 to 20% by weight, particularly preferably from 0 to 10% by weight.

It is moreover possible to add to the moldings at least one polymer, where this is added in the form of a polymer to the composition. These added polymers can by way of example comprise groups which are suitable for the formation of block copolymers and/or graft copolymers with the polymer formed from the lactam. Examples of these groups are epoxy, amine, carboxy, anhydride, oxazoline, carbodiimide, urethane, isocyanate, and lactam groups.

Another possibility for improving the properties of the product, the compatibilities of the components, and viscosity, is to add to the moldings at least one polymer (PM) selected from the group consisting of polystyrene, styrene copolymers, such as styrene-acrylonitrile copolymers (SAN), acrylonitrile-butadiene-styrene copolymers (ABS), or styrene-butadiene copolymers (SB), polyphenylene oxide ethers, polyolefins, such as polyethylene (HTPE (high-temperature polyethylene), LTPE (low-temperature polyethylene)), polypropylene, or poly-1-butene, polytetrafluoroethylene; polyesters, such as polyethyleneterephthalate (PET) or polyamides; polyethers, e.g. polyethylene glycol (PEG), or polypropylene glycol, or polyether sulfones (PESU or PES); polymers of monomers comprising vinyl groups, e.g. polyvinyl chloride, polyvinylidene chlorides, polystyrene, impact-modified polystyrene, polyvinylcarbazole, polyvinyl acetate, polyvinyl alcohol, polyisobutylene, polybutadiene, polysulfone, and copolymers of the polymers mentioned.

It is moreover possible to add a crosslinking monomer to the moldings. A crosslinking monomer can be a compound which comprises more than one group which can be copolymerized with the lactam. Examples of these groups are epoxy, amine, carboxy, anhydride, oxazoline, carbodiimide, urethane, isocyanate, and lactam groups. Examples of suitable crosslinking monomers are amino-substituted lactams, such as aminocaprolactam, aminopiperidone, aminopyrrolidone, aminolaurolactam, and mixtures of these, preferably aminocaprolactam, aminopyrrolidone, and mixtures of these, particularly preferably aminocaprolactam.

Filler and/or fibrous material that is added to the moldings can comprise an organic or inorganic filler and/or fibrous material. By way of example, it is possible to use an inorganic filler, such as kaolin, chalk, wollastonite, talc powder, calcium carbonate, silicates, titanium dioxide, zinc oxide, graphite, glass particles, e.g. glass beads, nanoscale filler, such as carbon nanotubes, carbon black, nanoscale phyllosilicates, nanoscale aluminum oxide ($Al_2O_3$), nanoscale titanium dioxide ($TiO_2$), carbon nanotubes, graphene, phyllosilicates, and nanoscale silicon dioxide ($SiO_2$).

It is further preferable that the filler and/or fibrous material used comprises fibrous materials. It is possible here to use one or more fibrous materials selected from known inorganic reinforcing fibers, such as boron fibers, glass fibers, carbon fibers, silica fibers, ceramic fibers, and basalt fibers; organic reinforcing fibers, such as aramid fibers, polyester fibers, nylon fibers, polyethylene fibers, and natural fibers, such as wood fibers, flax fibers, hemp fibers, and sisal fibers.

It is particularly preferable to use glass fibers, in particular chopped glass fibers, carbon fibers, aramid fibers, boron fibers, metal fibers, or potassium titanate fibers. The fibers mentioned can be used in the form of short fibers or long fibers, or in the form of a mixture of short and long fibers. The average fiber length of the short fibers here is preferably in the range from 0.1 to 1 mm. Preference is further given to fibers with an average fiber length in the range from 0.5 to 1 mm. The average fiber length of the long fibers used is preferably above 1 mm, with preference in the range from 1 to 50 mm.

In particular, it is also possible to add mixtures of the fillers and/or fibrous materials mentioned. The filler and/or fibrous material added particularly preferably comprises glass fibers and/or glass particles, in particular glass beads.

Examples of other additives that can be added are light stabilizers, PVC stabilizers, or other stabilizers, such as copper salts, dyes, antistatic agents, release agents, antioxidants, lubricants, flame retardants, blowing agents, impact modifiers, and nucleating agents.

Preference is given to addition of an impact modifier as additive, in particular a polydiene polymer (e.g. polybutadiene, polyisoprene) comprising anhydride and/or epoxy groups. The glass transition temperature of the polydiene polymer is in particular below 0° C., preferably below −10° C., particularly preferably below −20° C. The polydiene polymer can be one based on a polydiene copolymer with polyacrylates, polyethylene acrylates, and/or polysiloxanes, and can be produced by means of the processes known to the person skilled in the art (e.g. emulsion polymerization, suspension polymerization, solution polymerization, gas-phase polymerization).

In the process of the invention for producing moldings, a mixture comprising
(A) at least one lactam
(B) at least one catalyst
(C) at least one activator
(D) optionally at least one additional substance proceeds through treatments comprising
a) mixing of (A), (B), and (C), and also optionally (D), b) metering the mixture into an apparatus for producing mixture droplets comprising (A), (B), and (C), and also optionally (D), and producing mixture droplets,
c) depositing the mixture droplets on a belt, and
d) producing moldings.

It is preferable that the proportions by weight of (A), (B), (C), and (D) in the mixture give 100% by weight.

It is generally advantageous to minimize contamination, e.g. water, carbon dioxide, and oxygen. In particular, the process steps of the invention are conducted with substantial exclusion of oxygen, carbon dioxide, and water. It is preferable that the steps a) to c), and in particular a) to d), take place in an inert gas atmosphere (e.g. under nitrogen). The inert gas here can be conducted cocurrently or countercurrently by way of example with respect to the movement of the belt, preferably cocurrently. After the gas has passed through the system it is preferable that at least to some extent, preferably to an extent of at least 50%, particularly preferably to an extent of 75%, it is returned to the reaction space in the form of circulated gas. A portion of the inert gas is usually discharged after each pass through the system, preferably up to 10%, particularly preferably up to 3%, very particularly preferably up to 1%.

In another embodiment, it is also possible to use dry air instead of inert gas. The relative humidity of this air is intended to be below 10%. The relative humidity of the air can be determined by using a hair hygrometer from Fischer, DE. Relative humidity means the percentage relationship between the present water vapor pressure and the saturation water vapor pressure (at the temperature of the air) over a clean and level water surface.

The reaction can be conducted at atmospheric pressure, at superatmospheric pressure or at subatmospheric pressure, preference being given to a superatmospheric pressure of up to 300 mbar above ambient pressure, i.e. up to 1.3 atmospheres.

In one embodiment of the invention, steps a), b), and c) are conducted independently of one another at a temperature which is in the range from the melting point of the highest-melting-point lactam comprised in the mixture to 100° C. above the melting point of the highest-melting-point lactam comprised in the mixture. For the purposes of the invention, the expression "independently of one another" means that the temperature during the steps a), b), and c) does not have to be identical but can be varied within the ranges mentioned.

The mixing of the components in step a) can take place in a batch process or continuous process in apparatuses which are suitable and known to the person skilled in the art. By way of example, the components can be mixed continuously in a low-pressure mixing machine and/or batchwise in a stirred tank. It is preferable to mix the components continuously in a low-pressure or high-pressure mixing machine. Machines of this type are marketed by way of example by the companies Tartler, DE; Krauss-Maffei, DE; Unipre, DE, or ATP, CH.

In one particularly preferred embodiment of the process of the invention, the separate melts made of lactam, catalyst, and activator are respectively separately provided at a temperature just above the melting point thereof, they are then mixed, and are then cooled to a temperature just above the freezing point of the mixed melt, before the mixture is introduced into step b).

After the mixing process, the metering of the mixture takes place in step b) in an apparatus for producing mixture droplets comprising (A), (B), and (C), and also optionally (D), and mixture droplets are produced.

Mixture droplets can be produced via spraying by way of a nozzle or via dropletization. The feed systems and metering lines here have been heated to a temperature above the melting point of the lactam (A) used.

Process step b) for producing mixture droplets can use one or more spray nozzles or casting nozzles. The spray nozzles that can be used are not subject to any restriction. The liquid to be sprayed can be introduced under pressure into these nozzles. The liquid to be sprayed can be comminuted here by depressurization after reaching a certain minimum velocity in the nozzle aperture. It is also possible to use single-fluid nozzles for the purpose of the invention, examples being slot nozzles, or centrifugal chambers (solid-cone nozzles) (for example from Düsen-Schlick GmbH, DE, or from Spraying Systems Deutschland GmbH, DE).

Throughput per spray nozzle is advantageously from 0.1 to 10 m$^3$/h, often from 0.5 to 5 m$^3$/h.

It is equally possible to produce mixture droplets via laminar breakdown of a jet, as described in Rev. Sci. Instr. 38 (1966) 502.

The mixture droplets can also be produced by means of pneumatic drawing dies, rotation, section of a jet, or rapid-response microvalve dies.

In a pneumatic drawing die, a jet of liquid is accelerated together with a gas stream through an aperture. The diameter of the jet of liquid, and thus the diameter of the mixture droplets, can be influenced by way of the amount of gas used.

When mixture droplets are produced via rotation, the liquid passes through the openings in a rotating disk. The centrifugal force acting on the liquid disentrains mixture droplets of defined size. Preferred apparatuses for rotation dropletization are described by way of example in DE 43 08 842 A1.

However, it is also possible to use a rotating blade to chop the emerging liquid jet into defined segments. Each segment then forms a mixture droplet.

Use of microvalve dies directly produces mixture droplets with defined liquid volume.

The metered mixture droplets are deposited on a belt in a step c). The belt is preferably moved with a velocity of from 1 to 20 m/min. The location of the belt is preferably in a space to which an inert gas is supplied.

In a step d), moldings are produced on the belt on which the mixture droplets have been deposited in step c). The moldings can be produced on the belt by heating the belt to a temperature which is suitable for polymerizing component (A). It is preferable that the belt on which the mixture droplets have been deposited in step c) is heated to a temperature in the range from 130 to 250° C., preferably from 130 to 190° C. The conversion of the mixture droplets to moldings takes place on the belt. The heating of the belt and/or of the gas atmosphere above the belt polymerizes component (A) to give polyamide.

The mixture droplets which in step d) become moldings on the belt have a residence time of from 20 sec to 20 min on the belt, in particular from 40 sec to 15 minutes, preferably from 40 sec to 10 min.

The size of the moldings from the process of the invention can be selected freely, but generally depends on practical factors. Moldings which are either very small or else very large are often difficult to handle during packaging or further processing. By way of example, they are difficult to input into the processing machine, or are difficult to meter. The moldings can be elongate to round. Preference is given to moldings of which the longest axis is in the range from 0.05 to 15 mm, preferably in the range from 0.1 to 11 mm, particularly preferably in the range from 1 to 9 mm, for example from 3 to 8 mm, and of which the shortest axis is in the range from 0.05 to 15 mm, preferably in the range from 0.1 to 11 mm, particularly preferably in the range from 1 to 9 mm, for example from 3 to 8 mm.

The size and the shape of the moldings can by way of example be influenced by way of the size of the nozzle through which the polymer melt is forced, but can also be influenced via the throughput, the viscosity of the polymer melt, and the velocity at which this is comminuted. The person skilled in the art is aware of these measures or can implement them by using methods known per se (e.g. Granulieren von Thermoplasten: Systeme im Vergleich [Granulation of thermoplastics: comparison of systems], annual conference on compounding technology, Baden-Baden, 24./25.11.99 , VDI Verlag pp. 327 to 401).

The shape and size of the moldings obtained via the process of the invention are particularly suitable for storage, for transport, and for further processing. Specifically the flowability and the uniform product size of the moldings permit easy further processing by using commercially available extruders and/or injection-molding machines for thermoplastics.

A system for the process of the invention can moreover save space when compared with conventional systems for anionic or thermal polymerization. The replacement of conventional prilling towers by a less voluminous belt in particular saves space.

The examples below provide further explanation of the invention. These examples illustrate some aspects of the present invention but are in no way to be considered as restricting the scope of protection of said invention.

COMPARATIVE EXAMPLE 1

$\epsilon$-Caprolactam was continuously mixed in a static mixer at 85° C. at a conveying rate of 8.44 kg/h with a solution composed of 95.2% by weight of $\epsilon$-caprolactam and 4.8% by weight of sodium caprolactamate, the conveying rate at which the solution was added being 4.25 kg/h. The temperature of said mixture was controlled to 80° C. After continuous addition of 0.55 kg/h of a solution composed of 80% by weight of N,N'-hexamethylenebis(carbamoyl-$\epsilon$-caprolactam) and 20% by weight of caprolactam, the resultant mixture was sprayed into a nitrogen-inertized spray tower (also termed prilling tower) by means of a two-fluid nozzle. The temperature of the gas phase in the spray tower was 225° C. Measurement of ten randomly selected particles under a microscope showed that the number-average longest axis of the moldings was 160 µm, and the number-average shortest axis was 150 µm.

COMPARATIVE EXAMPLE 2

$\epsilon$-Caprolactam was continuously mixed in a static mixer at 95° C. at a conveying rate of 8.44 kg/h with a solution composed of 95.2% by weight of $\epsilon$-caprolactam and 4.8% by weight of sodium caprolactamate, the conveying rate at which the solution was added being 4.25 kg/h. The temperature of said mixture was controlled to 90° C. After continuous addition of 0.55 kg/h of a solution composed of 80% by weight of N,N'-hexamethylenebis(carbamoyl-$\epsilon$-caprolactam) and 20% by weight of caprolactam, the resultant mixture was sprayed into a nitrogen-inertized spray tower by means of a two-fluid nozzle. The temperature of the gas phase in the spray tower was 195° C. Measurement of ten randomly selected particles under a microscope showed that the number-average longest axis of the moldings was 120 µm, and the number-average shortest axis was 110 µm.

INVENTIVE EXAMPLE 3

$\epsilon$-Caprolactam was continuously mixed in a static mixer at 85° C. at a conveying rate of 8.44 kg/h with a solution composed of 95.2% by weight of $\epsilon$-caprolactam and 4.8% by weight of sodium caprolactamate, the conveying rate at which the solution was added being 4.25 kg/h. The temperature of said mixture was controlled to 80° C. After continuous addition of 0.55 kg/h of a solution composed of 80% by weight of N,N'-hexamethylenebis(carbamoyl-$\epsilon$-caprolactam) and 20% by weight of caprolactam, the resultant mixture was deposited onto a belt heated to 160° C. under 1.1 atmosphere (gauge pressure of 0.1 bar), by way of a die based on a plate with a plurality of perforations. Belt speed was 3 m/min. The temperature of the gas phase above the belt was 150° C. Measurement of ten randomly selected moldings under a microscope showed that the number-average longest axis of the moldings was 5 mm, and the number-average shortest axis was 3 mm. Weight-average molar mass (Mw) was determined by means of GPC against a polystyrene standard, and was 600 000 g/mol.

INVENTIVE EXAMPLE 4

$\epsilon$-Caprolactam comprising 10% by weight of short glass fiber (from OCV) was continuously mixed in a static mixer at 85° C. at a conveying rate of 8.44 kg/h with a solution composed of 95.2% by weight of $\epsilon$-caprolactam and 4.8% by weight of sodium caprolactamate, the conveying rate at which the solution was added being 4.25 kg/h. The temperature of said mixture was controlled to 80° C. After continuous addition of 0.55 kg/h of a solution composed of 80% by weight of N,N'-hexamethylenebis(carbamoyl-$\epsilon$-caprolactam) and 20% by weight of caprolactam, the resultant mixture was deposited onto a belt heated to 160° C. under a gauge pressure of 0.1 atmosphere, by way of a die based on a plate with a plurality of perforations. The belt speed was 3 m/min. The temperature of the gas phase above the belt was 150° C. Measurement of ten randomly selected moldings under a microscope showed that the number-average longest axis of the moldings was 5 mm, and the number-average shortest axis was 4 mm. Weight-average molar mass (Mw) was determined by means of GPC against a polystyrene standard, and was 400 000 g/molf

The invention claimed is:

1. A process for producing moldings from a mixture comprising
   (A) at least one lactam,
   (B) at least one catalyst,
   (C) at least one activator, and
   (D) optionally at least one additional substance,
   wherein the process proceeds through treatments comprising
   a) mixing of (A), (B), and (C),
   b) metering of the mixture into an apparatus for producing mixture droplets comprising (A), (B), and (C) and producing mixture droplets,
   c) depositing the mixture droplets on a belt, and
   d) producing moldings, wherein the mixture droplets on the belt in step d) are heated to a temperature from 130 to 250° C. to produce moldings.

2. The process according to claim 1, wherein the steps a), b), and c) are conducted independently of one another at a temperature which is in the range from the melting point of the highest-melting-point lactam comprised in the mixture to 100° C. above the melting point of the highest-melting-point lactam comprised in the mixture.

3. The process according to claim 1, where the mixture in droplets which become moldings on the belt in step d) have a residence time of from 20 sec to 20 min on the belt in step d).

4. The process according to claim 1, wherein the longest axis of the moldings is in the range from 0.05 to 15 mm and the shortest axis of the moldings is in the range from 0.05 to 15 mm.

5. The process according to claim 1, wherein the molding consists essentially of a polyamide having a weight-average molar mass (Mw) of from 50,000 to 1,000,000 g/mol.

6. A molding produced by the process of claim 1.

* * * * *